United States Patent
Swindell et al.

(10) Patent No.: US 11,275,149 B2
(45) Date of Patent: Mar. 15, 2022

(54) DETERMINING A LOCATION OF AN ELECTRONIC DEVICE

(71) Applicant: Embarcadero Technologies, Inc., Austin, TX (US)

(72) Inventors: Michael L. Swindell, Aptos, CA (US); Diego Navarro, Alicante (ES); Jorge Alcalde, Alicante (ES); Ivan Gracia Maciá, Alicante (ES)

(73) Assignee: Embarcadero Technologies, Inc., Austin, TX (US)

( * ) Notice: Subject to any disclaimer, the term of this patent is extended or adjusted under 35 U.S.C. 154(b) by 88 days.

(21) Appl. No.: 15/462,513

(22) Filed: Mar. 17, 2017

(65) Prior Publication Data
US 2017/0269189 A1    Sep. 21, 2017

Related U.S. Application Data

(60) Provisional application No. 62/310,548, filed on Mar. 18, 2016.

(51) Int. Cl.
*G01S 5/14* (2006.01)
*H04W 4/02* (2018.01)
(Continued)

(52) U.S. Cl.
CPC .............. *G01S 5/14* (2013.01); *G01S 1/024* (2013.01); *G01S 5/0036* (2013.01);
(Continued)

(58) Field of Classification Search
CPC ........ G01S 5/14; G01S 5/0036; G01S 5/0278; G01S 1/024
See application file for complete search history.

(56) References Cited

U.S. PATENT DOCUMENTS

| 6,990,428 B1 * | 1/2006 | Kaiser | G01S 5/14 702/150 |
| 8,026,814 B1 * | 9/2011 | Heinze | G08B 13/1427 340/572.1 |

(Continued)

OTHER PUBLICATIONS

Microwaves101 _ Propagation Constant, Located at https://www.microwaves101.com/encyclopedias/propagation-constant, Retrieved on Jan. 10, 2020 (Year: 2020).*

(Continued)

*Primary Examiner* — Gennadiy Tsvey

(57) ABSTRACT

In a method for determining a location of an electronic device, a plurality of beacon signals are received from a plurality of beacon devices at the electronic device, wherein each beacon signal of the plurality of beacon signals includes an identity of a beacon device transmitting a respective beacon signal, and each beacon device of the plurality of beacon devices has a known location. A received signal strength for each beacon signal of the plurality of beacon signals is measured. A distance of the electronic device from each beacon device for which the plurality of beacon signals is received is determined, wherein the distance of the electronic device from a beacon device is based at least in part on the received signal strength of the beacon signal transmitted by the beacon device. A location of the electronic device is determined based at least on part on the distance of the electronic device from each beacon device for which the plurality of beacon signals is received.

15 Claims, 7 Drawing Sheets

(51) Int. Cl.
*G01S 5/00* (2006.01)
*G01S 5/02* (2010.01)
*G01S 1/02* (2010.01)
*H04W 4/029* (2018.01)

(52) U.S. Cl.
CPC ........... *G01S 5/0278* (2013.01); *H04W 4/023* (2013.01); *H04W 4/029* (2018.02)

(56) References Cited

U.S. PATENT DOCUMENTS

| | | | | |
|---|---|---|---|---|
| 8,712,690 | B1* | 4/2014 | White | G01S 5/0252 701/526 |
| 8,738,024 | B1* | 5/2014 | Kerr | G06Q 30/0233 455/456.5 |
| 9,068,374 | B2* | 6/2015 | Jayadevappa | E05B 47/0012 |
| 9,204,251 | B1* | 12/2015 | Mendelson | G08G 1/14 |
| 9,615,347 | B1* | 4/2017 | Kerr | G06Q 30/0233 |
| 9,832,617 | B1* | 11/2017 | Mayor | H04W 4/027 |
| 2005/0171720 | A1* | 8/2005 | Olson | H04W 12/122 702/121 |
| 2006/0075131 | A1* | 4/2006 | Douglas | G01S 5/0252 709/230 |
| 2006/0290519 | A1* | 12/2006 | Boate | G07C 9/28 340/573.4 |
| 2007/0184852 | A1* | 8/2007 | Johnson | H04W 64/00 455/456.1 |
| 2007/0247366 | A1* | 10/2007 | Smith | H04W 4/33 342/464 |
| 2008/0274752 | A1* | 11/2008 | Houri | G01S 5/0252 455/456.1 |
| 2009/0054076 | A1* | 2/2009 | Evennou | G01S 5/0263 455/456.1 |
| 2009/0102642 | A1* | 4/2009 | Huseth | G01S 5/14 340/539.13 |
| 2009/0286548 | A1* | 11/2009 | Coronel | H04W 4/20 455/456.1 |
| 2010/0109864 | A1* | 5/2010 | Haartsen | G01C 21/206 340/539.13 |
| 2011/0030875 | A1* | 2/2011 | Conte | F16L 55/1652 156/64 |
| 2011/0081918 | A1* | 4/2011 | Burdo | H04L 67/18 455/456.1 |
| 2012/0022784 | A1* | 1/2012 | Louis | G01C 21/165 701/445 |
| 2012/0203453 | A1* | 8/2012 | Lundquist | G01C 21/005 701/434 |
| 2014/0045520 | A1* | 2/2014 | Lim | H04W 4/023 455/456.1 |
| 2014/0087754 | A1* | 3/2014 | Siomina | G01S 5/0215 455/456.1 |
| 2014/0087758 | A1* | 3/2014 | Maor | G01S 5/0252 455/456.1 |
| 2014/0139375 | A1* | 5/2014 | Faragher | G01S 5/0294 342/451 |
| 2014/0141803 | A1* | 5/2014 | Marti | G01S 5/0278 455/456.2 |
| 2014/0206389 | A1* | 7/2014 | Aldana | H04W 4/021 455/456.2 |
| 2014/0221005 | A1* | 8/2014 | Marshall | G01S 5/0273 455/456.1 |
| 2014/0237076 | A1* | 8/2014 | Goldman | G06F 16/9537 709/217 |
| 2014/0302869 | A1* | 10/2014 | Rosenbaum | G01S 5/14 455/456.1 |
| 2014/0342754 | A1* | 11/2014 | Liu | H04W 4/023 455/456.2 |
| 2015/0079942 | A1* | 3/2015 | Kostka | G06Q 30/0267 455/411 |
| 2015/0119076 | A1* | 4/2015 | Cohen | G01S 5/0236 455/456.1 |
| 2015/0181384 | A1* | 6/2015 | Mayor | H04W 24/02 455/456.1 |
| 2015/0289111 | A1* | 10/2015 | Ozkan | H04L 61/6022 455/456.1 |
| 2015/0294084 | A1* | 10/2015 | McCauley | G16H 80/00 705/2 |
| 2015/0327022 | A1* | 11/2015 | Lin | G01S 5/0263 455/456.1 |
| 2015/0334676 | A1* | 11/2015 | Hart | H04W 64/003 455/456.1 |
| 2016/0029157 | A1* | 1/2016 | Egan | H04W 4/80 455/456.2 |
| 2016/0139239 | A1* | 5/2016 | Thiagarajan | G01S 5/10 455/456.1 |
| 2016/0202341 | A1* | 7/2016 | Burgess | G01S 5/021 342/452 |
| 2016/0204879 | A1* | 7/2016 | Niewczas | H04B 11/00 455/41.1 |
| 2016/0381582 | A1* | 12/2016 | Li | G01S 1/024 370/252 |
| 2017/0032442 | A1* | 2/2017 | White | G06Q 30/0631 |

OTHER PUBLICATIONS

Wikipedia—Propagation constant, Located at https://en.wikipedia.org/wiki/Propagation_constant, Retrieved on Jan. 10, 2020 (Year: 2020).*
Everything RF—What is the Propagation Constant, Located at https://www.everythingrf.com/community/what-is-the-propagation-constant, Retrieved on Jan. 10, 2020 (Year: 2020).*
Dellaert, et al., "Monte Carlo Localization for Mobile Robots", Computer Science Department, Carnegie Mellon University, Pittsburgh PA 15213, Institute of Computer Science III, University of Bonn, D-53117 Bonn, 1999, 7 Pages.
Dong, et al., "Evaluation of the Reliability of RSSI for Indoor Localization", Wireless Communications in Unusual and Confined Areas (ICWCUCA), 2012 International Conference on, Aug. 28-30, 2012, http://www.rn.inf.tu-dresden.de/dargie/papers/icwcuca.pdf, 1-6.
Maheshwari, et al., "Simple and Effective Online Rssi Calibration Method in Wireless Sensor Networks Wsns", Sindh University Research Journal (Science Series), University of Leeds, Leeds, United Kingdon. Revised Nov. 10, 2012 http://www.sujo.usindh.edu.pk/index.php/SURJ/article/view/254, 95-100.
Theresa, et al., "Comparison of Extended and Unscented Kalman Filter for Localization of Passive UHF RFID Labels", General Assembly and Scientific Symposium, 2011 XXXth URSI, Aug. 13-20, 2011, http://www.dt.e-technik.tu-dortmund.de/publikationen/documents/D01-2.pdf, Aug. 13-20, 2011, 1-4.

* cited by examiner

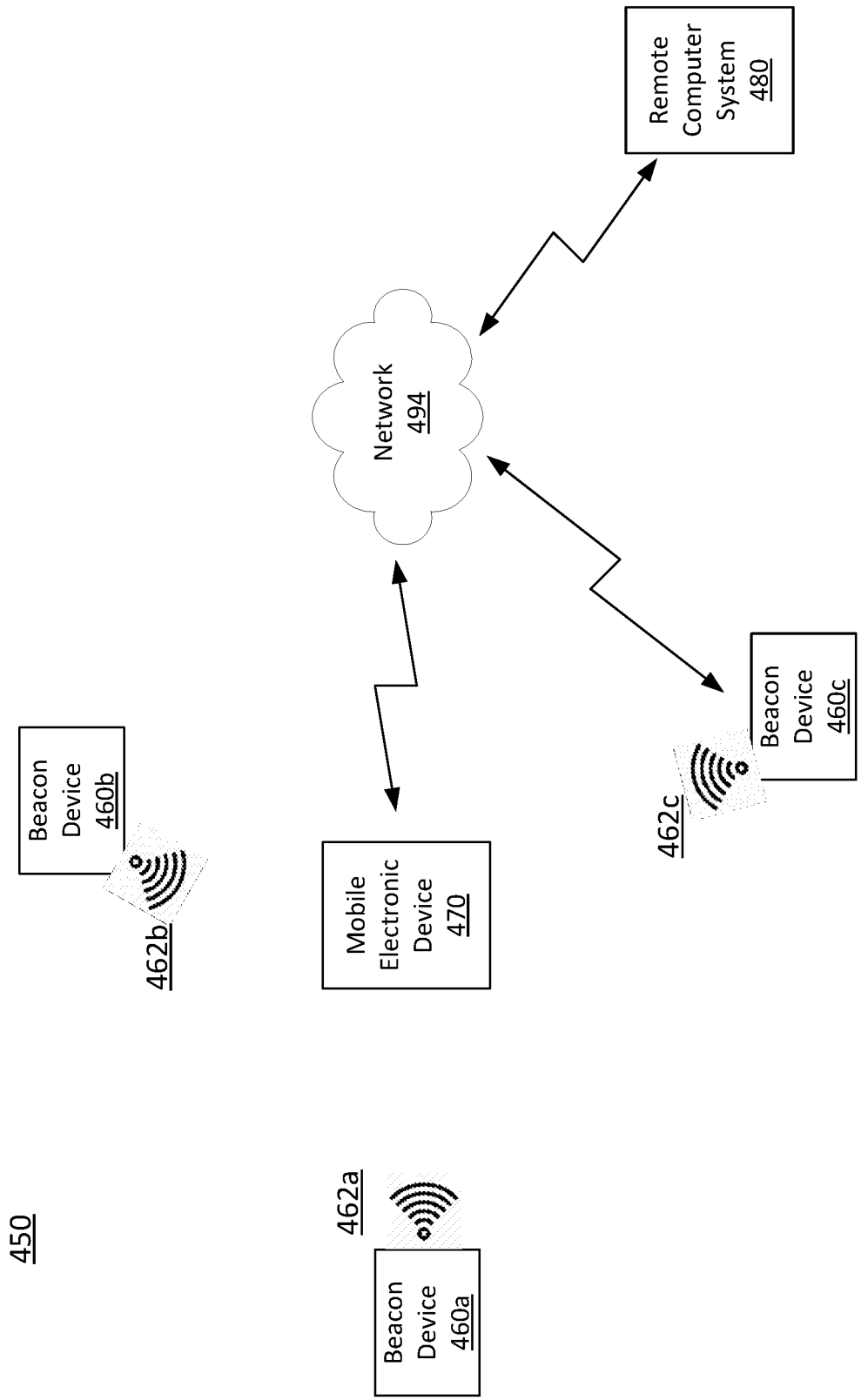

DETERMINING A LOCATION OF AN ELECTRONIC DEVICE

RELATED APPLICATIONS

This application claims priority to and the benefit of U.S. Patent Provisional Patent Application 62/310,548, filed on Mar. 18, 2016, entitled "BEACON FENCING," by Swindell et al., and assigned to the assignee of the present application, which is incorporated herein by reference in its entirety.

BACKGROUND

Modern technology has a seen a proliferation of electronic devices. Electronic devices can be small stationary devices that broadcast information or mobile devices that move through an environment. These devices may or may not be networked to one another and may have network capabilities that allow them to send and receive data. Moreover, the electronic devices may or may not be wireless and may or may not gather or generate data.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 4A and 4B illustrate example environments in which a location of a mobile electronic device is determined, according to some embodiments.

DESCRIPTION OF EMBODIMENTS

Figure 1:
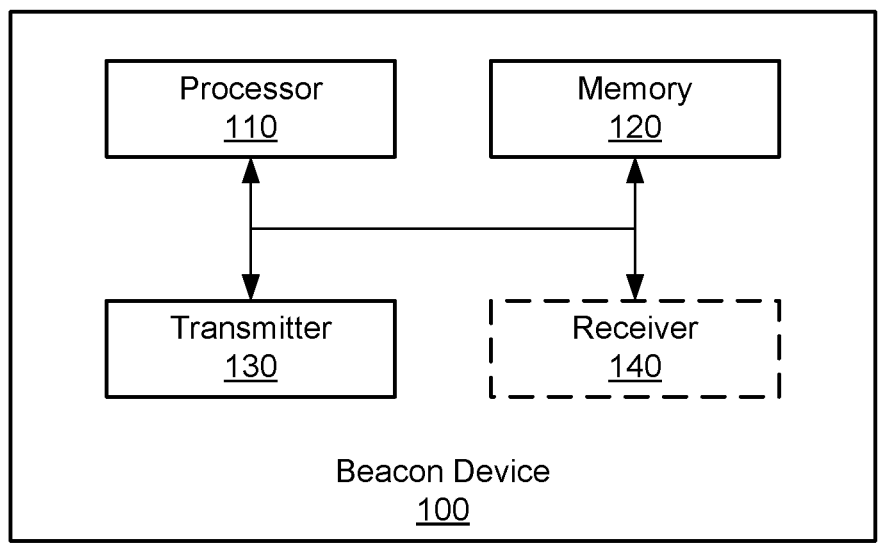
FIG. 1 is a block diagram of an example beacon device upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "adjusting," "sorting," "applying," "displaying," "detecting," "initiating," "communicating," "calibrating," "generating," or the like, refer to the actions and processes of an electronic device such as: a processor, a memory, a computing system, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example components of a system for determining a location of a device. Example environments in which a location of a mobile electronic device is determined are then described. Example location determination of a mobile electronic device using beacon devices are then described.

In various embodiments, methods for determining a location of an electronic device are provided. A plurality of beacon signals are received from a plurality of beacon devices at the electronic device, wherein each beacon signal of the plurality of beacon signals includes an identity of a beacon device transmitting a respective beacon signal, and each beacon device of the plurality of beacon devices has a known location. A received signal strength for each beacon signal of the plurality of beacon signals is measured. A distance of the electronic device from each beacon device for which the plurality of beacon signals is received is determined, wherein the distance of the electronic device from a beacon device is based at least in part on the received signal strength of the beacon signal transmitted by the beacon device. A location of the electronic device is determined based at least on part on the distance of the electronic device from each beacon device for which the plurality of beacon signals is received.

In general, a beacon is a simple device or gadget that is placed in an environment that may be stationary and is configured to broadcast its identification (ID). The identification may or may not include a location and the beacon may or may not generate data that is broadcast. In one embodiment, the beacon only wirelessly broadcasts an identification signal. In one embodiment, the beacon may be mobile and may be tracked by the present technology in the environment.

In accordance with various embodiments, a mobile electronic device such as a computer system, laptop, tablet, smart phone, server, or other electronic device, includes a receiver that can listen for the broadcasts from the beacon. For example, the mobile electronic device may include a Bluetooth receiver that is able to receive a signal from a beacon that is broadcasting an ID over Bluetooth. In one embodiment, the mobile electronic device is also able to determine the power level of the beacon based on the broadcast from the beacon. The beacon may or may not specifically broadcast its power level with the ID.

In one embodiment, the mobile electronic device is able to determine the power level of the beacon based on a pre-programmed knowledge of the beacon including the model type of the beacon. In one embodiment, the mobile electronic device is able to determine the power level of the beacon based on the signal strength of the broadcast from the beacon. In other embodiments, the mobile electronic device is able to communicate the received signals to a remote computer system for processing.

In one embodiment, the mobile electronic device is able to determine the distance between the mobile electronic device and the beacon based on the received signal from the beacon. In one embodiment, the mobile electronic device is able to determine the distance between the mobile electronic device and a plurality of beacons. The distances between the mobile electronic device and the plurality of beacons can be used to determine a location of the mobile electronic device. In various embodiments, the location of the mobile electronic device can be compared to a map of an environment for determining whether to initiate actions depending on a location of the mobile electronic device.

In another embodiment, a remote computer system is able to determine the distance between the mobile electronic device and the beacon based on the received signal from the beacon. In one embodiment, the remote computer system is able to determine the distance between the mobile electronic device and a plurality of beacons. The distances between the mobile electronic device and the plurality of beacons can be used to determine a location of the mobile electronic device. In various embodiments, the location of the mobile electronic device can be compared to a map of an environment for determining whether to initiate actions depending on a location of the mobile electronic device.

Example Components of a System for Determining a Location of a Device

Turning now to the figures, FIG. 1 is a block diagram of an example beacon device 100 upon which embodiments described herein may be implemented. Beacon device 100 is an electronic device that is capable of broadcasting its identifier such that nearby electronic devices (e.g., mobile electronic devices) are able to receive the identifier. As will be appreciated, beacon device 100 can be implemented using any type of electronic device capable of communicating its identifier. In accordance with various embodiments, beacon device 100 includes the minimum componentry required to provide identifier transmission functionality, and it should be appreciated that beacon device 100 may include other components and may provide other functionality.

As illustrated, beacon device 100 includes processor 110, memory 120 and transmitter 130. Processor 110 may be any type of processor as described above. Memory 120 may include computer usable volatile memory and/or computer usable non-volatile memory for storing information and instructions for processor 110. Transmitter 130 is configured to emit a signal including an identifier of beacon device 100. In one embodiment, the identifier is a unique identifier, e.g., a universally unique identifier (UUID). In accordance with various embodiments, transmitter 130 can be implemented using any type of wireless technology for communicating data, such as Bluetooth, Bluetooth Low Energy (BLE), Wi-Fi, Z-Wave, ZigBee, or any other type of wireless technology, including proprietary wireless technology.

In one embodiment, beacon device 100 includes optional receiver 140. Beacon device 100 may communicate with a network and receive data via receiver 140. For example, a remote management system can communicate configuration data to beacon device 100 via receiver 140. In another example, a remote management system may poll beacon device 100 for information (e.g., power lever or transmission signal strength), which can then be communicated to the remote management system via transmitter 130.

In accordance with various embodiments, beacon device 100 may be a Bluetooth device in an environment (e.g., BLE). A beacon device 100 implementing BLE may regularly go to sleep and wake up only using power when necessary and may have a battery life that lasts in terms of years. It should be appreciated that the described embodiments may operate in indoor or outdoor environments or a combination of the two. The described embodiments are different than geofencing in that geofencing requires location information based on an external system such as Global Positioning System (GPS). For example, beacons in geofencing may broadcast their GPS location. Therefore, geofencing may be difficult or impossible to use indoors where the signal from satellites may be blocked by the structure. The described embodiments do not rely on, nor do they require, GPS location information. The described embodiments determine the location of a mobile electronic device based on signals received from beacon devices 100.

Embodiments described herein provide for a mobile electronic device to receive the signal including the identifier transmitted by beacon device 100. In accordance with various embodiments, a mobile electronic device is configured to receive signals including the identifier from multiple beacon devices 100. The received signals are processed to determine a location of the mobile electronic device. As will be described, it should be appreciated that the processing of the received signals may be performed at the mobile electronic device, at a remote computer system (e.g., a server or a remove management system), or at any combination of the mobile electronic device and a remote computer system.

Figure 2:
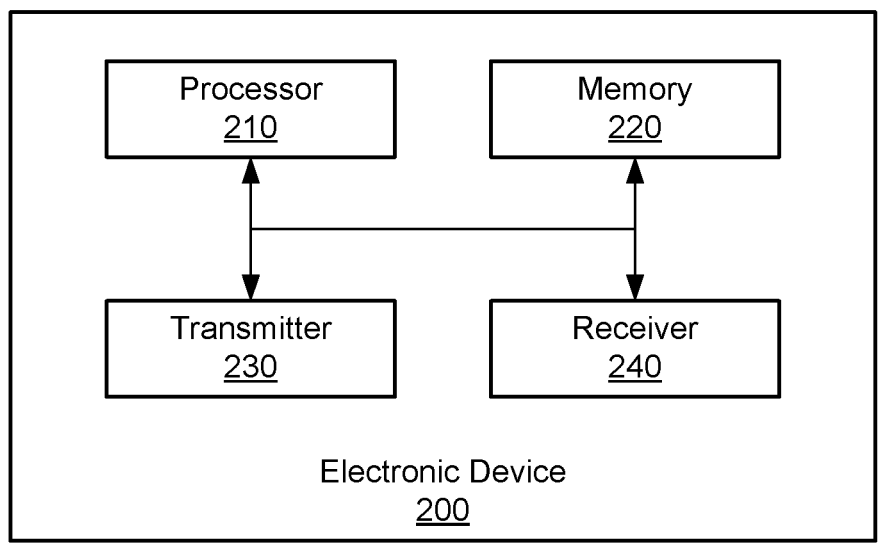
FIG. 2 illustrates an example electronic device upon which embodiments described herein may be implemented.

FIG. 2 illustrates an example electronic device upon which embodiments described herein may be implemented. Electronic device 200 is capable of receiving signals transmitted by beacon device 100, and communicating the received signals to a remote computer system (e.g., a server or a remove management system). In accordance with the illustrated embodiment, electronic device 200 includes the minimum componentry required to receive a wireless signal from a beacon device 100 and to communicate the contents of the wireless signal (e.g., the identifier) and information related to the receipt of the wireless signal (e.g., the received signal strength) to a remote computer system, and it should be appreciated that electronic device 200 may include other components and may provide other functionality.

In one embodiment, electronic device 200 is a simple device or gadget that is able to receive and transmit wireless signals. For example, electronic device 200 may be included within a keychain, a key fob or an identification card. In some embodiments, electronic device 200 is operable to perform some processing on the received signals prior to communicating information related to the signals to a remote computer system. It should be appreciated that electronic device 200 may perform any amount of processing, or no processing, of the received signals prior to communicating information related to the signals to a remote computer system. For example, electronic device 200 may operate in conjunction with electronic device 300 of FIG. 3 to determine a location of electronic device 200.

As illustrated, electronic device 200 includes processor 210, memory 220, transmitter 230 and receiver 240. Processor 210 may be any type of processor as described above. Memory 220 may include computer usable volatile memory and/or computer usable non-volatile memory for storing information and instructions for processor 210. Receiver 240 is configured to receive a signal from a beacon (e.g., beacon device 100) including an identifier of the transmitting beacon. In one embodiment, the identifier is UUID. In accordance with various embodiments, receiver 240 can be implemented using any type of wireless technology for communicating data, such as Bluetooth, BLE, Wi-Fi, Z-Wave, ZigBee, or any other type of wireless technology, including proprietary wireless technology.

Receiver 240 is also operable to measure a signal strength of the received signal, where the signal strength is an indication of the power level of the signal being received at receiver 240. The signal strength is impacted by the distance between receiver 240 and an emitting beacon (e.g., the signal strength weakens as the distance grows). The signal strength may also be impacted by the power source of the emitting beacon, the particular hardware of the beacon, and the manufacturer of the beacon. In one embodiment, the measure of signal strength is indicated as a received signal strength indicator (RSSI). In another embodiment, the measure of signal strength is indicated as the received channel power indicator (RCPI).

In one embodiment, electronic device 200 includes transmitter 230. Electronic device 200 may communicate with a network by transmitting data via transmitter 230. For example, electronic device 200 may communicate information related to the received signals (e.g., identifier and signal strength) to a remote computer system (e.g., a server or a remove management system) for further processing.

Figure 3:
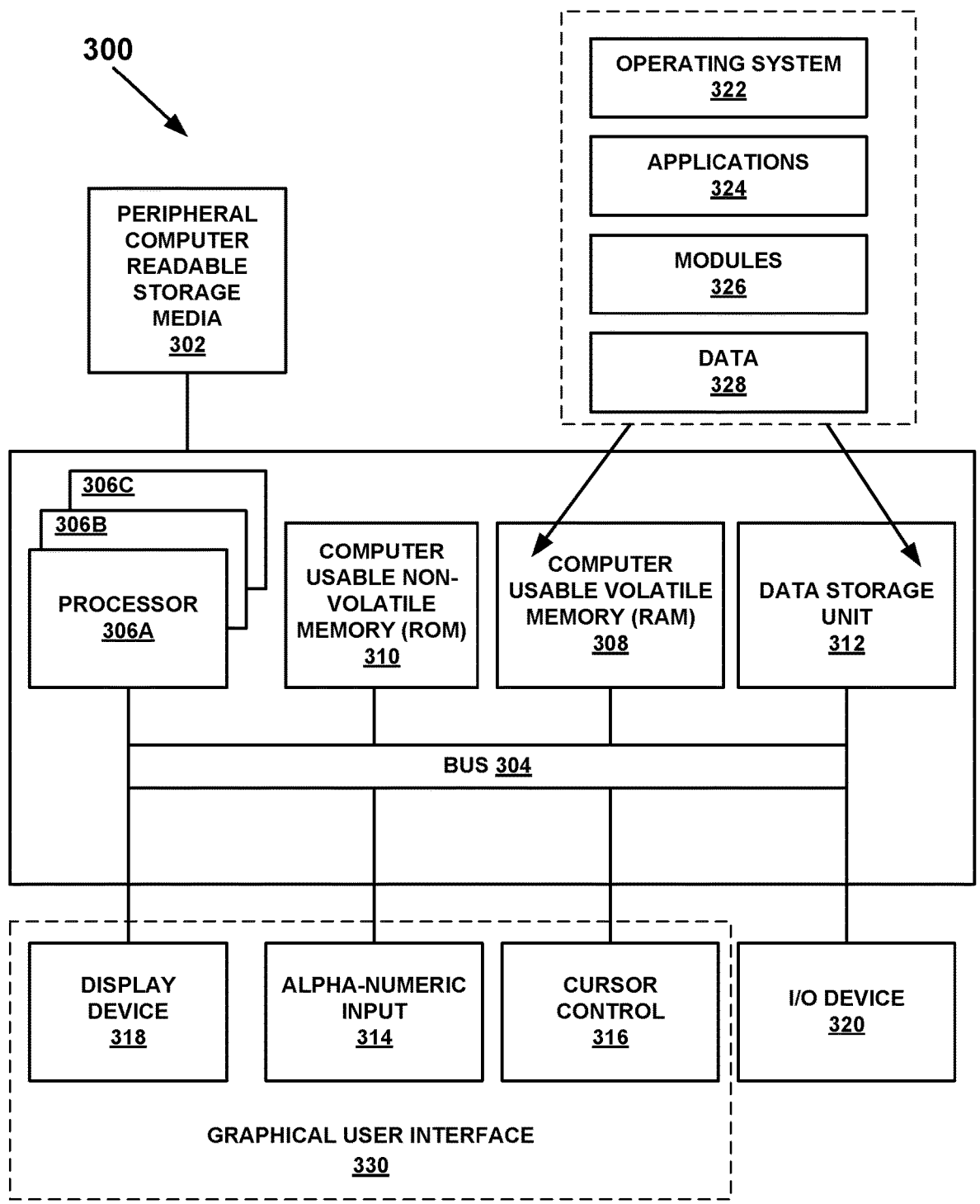
FIG. 3 illustrates another example electronic device upon which embodiments described herein be implemented.

FIG. 3 illustrates another example electronic device 300 upon which embodiments of the present invention can be implemented. FIG. 3 illustrates one example of a type of electronic device 300 (e.g., a computer system) that can be used in accordance with or to implement various embodiments which are discussed herein. As described above, it should be appreciated that the processing of the received signals may be performed at the mobile electronic device, at a remote computer system (e.g., a server or a remove management system), or at any combination of the mobile electronic device and a remote computer system. In one embodiment, the mobile electronic device that receives the signals from the beacon devices is implemented as electronic device 300. In one embodiment, a remote computer system in communication with the mobile electronic device is implemented as electronic device 300.

It is appreciated that electronic device 300 of FIG. 3 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, electronic device 300 of FIG. 3 is well adapted to having peripheral tangible computer-readable storage media 302 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Electronic device 300 of FIG. 3 includes an address/data bus 304 for communicating information, and a processor 306A coupled with bus 304 for processing information and instructions. As depicted in FIG. 3, electronic device 300 is also well suited to a multi-processor environment in which a plurality of processors 306A, 306B, and 306C are present. Conversely, electronic device 300 is also well suited to having a single processor such as, for example, processor 306A. Processors 306A, 306B, and 306C may be any of various types of microprocessors. Electronic device 300 also includes data storage features such as a computer usable volatile memory 308, e.g., random access memory (RAM), coupled with bus 304 for storing information and instructions for processors 306A, 306B, and 306C. Electronic device 300 also includes computer usable non-volatile memory 310, e.g., read only memory (ROM), coupled with bus 304 for storing static information and instructions for processors 306A, 306B, and 306C. Also present in electronic device 300 is a data storage unit 312 (e.g., a magnetic or optical disc and disc drive) coupled with bus 304 for storing information and instructions. Electronic device 300 also includes an alphanumeric input device 314 including alphanumeric and function keys coupled with bus 304 for communicating information and command selections to processor 306A or processors 306A, 306B, and 306C. Electronic device 300 also includes an cursor control device 316 coupled with bus 304 for communicating user input information and command selections to processor 306A or processors 306A, 306B, and 306C. In one embodiment, electronic device 300 also includes a display device 318 coupled with bus 304 for displaying information.

Referring still to FIG. 3, display device 318 of FIG. 3 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 316 allows the computer user to dynamically signal the movement of a visible symbol (cursor) on a display screen of display device 318 and indicate user selections of selectable items displayed on display device 318. Many implementations of cursor control device 316 are known in the art including a trackball, mouse, touch pad, touch screen, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands. Electronic device 300 is also well suited to having a cursor directed by other means such as, for example, voice commands. In various embodiments, alphanumeric input device 314, cursor control device 316, and display device 318, or any combination thereof (e.g., user interface selection devices), may collectively operate to provide a graphical user interface (GUI) 330 under the direction of a processor (e.g., processor 306A or processors 306A, 306B, and 306C). GUI 330 allows user to interact with electronic device 300 through graphical representations presented on display device 318 by interacting with alphanumeric input device 314 and/or cursor control device 316.

Electronic device 300 also includes an I/O device 320 for coupling electronic device 300 with external entities. For example, in one embodiment, I/O device 320 is a modem for enabling wired or wireless communications between electronic device 300 and an external network such as, but not limited to, the Internet. In some embodiments. I/O device includes a receiver configured to receive a signal from a beacon (e.g., beacon device 100) including an identifier of the transmitting beacon. In one embodiment, the identifier is UUID. In accordance with various embodiments, I/O device 320 can be implemented using any type of wireless technology for communicating data, such as Bluetooth, BLE, Wi-Fi, Z-Wave, ZigBee, or any other type of wireless technology, including proprietary wireless technology.

I/O device 320 is also operable to measure a signal strength of the received signal, where the signal strength is an indication of the power level of the signal being received at I/O device 320. The signal strength is impacted by the distance between I/O device 320 and an emitting beacon (e.g., the signal strength weakens as the distance grows). The signal strength may also be impacted by the power source of the emitting beacon, the particular hardware of the beacon, and the manufacturer of the beacon. In one embodiment, the measure of signal strength is indicated as a received signal strength indicator (RSSI). In another embodiment, the measure of signal strength is indicated as the received channel power indicator (RCPI).

In one embodiment, I/O device 320 includes a transmitter. Electronic device 300 may communicate with a network by transmitting data via I/O device 320. Electronic device 300 may also communicate with a mobile electronic device (e.g., electronic device 200) or another electronic device 300. For example, electronic device 300 may communicate information related to signals received from a beacon device (e.g., identifier and signal strength) to a remote computer system (e.g., another electronic device 300) for further processing.

Referring still to FIG. 3, various other components are depicted for electronic device 300. Specifically, when present, an operating system 322, applications 324, modules 326, and data 328 are shown as typically residing in one or some combination of computer usable volatile memory 308 (e.g., RAM), computer usable non-volatile memory 310 (e.g., ROM), and data storage unit 312. In some embodiments, all or portions of various embodiments described herein are stored, for example, as an application 324 and/or module 326 in memory locations within RAM 308, computer-readable storage media within data storage unit 312, peripheral computer-readable storage media 302, and/or other tangible computer-readable storage media.

Figure 4A:
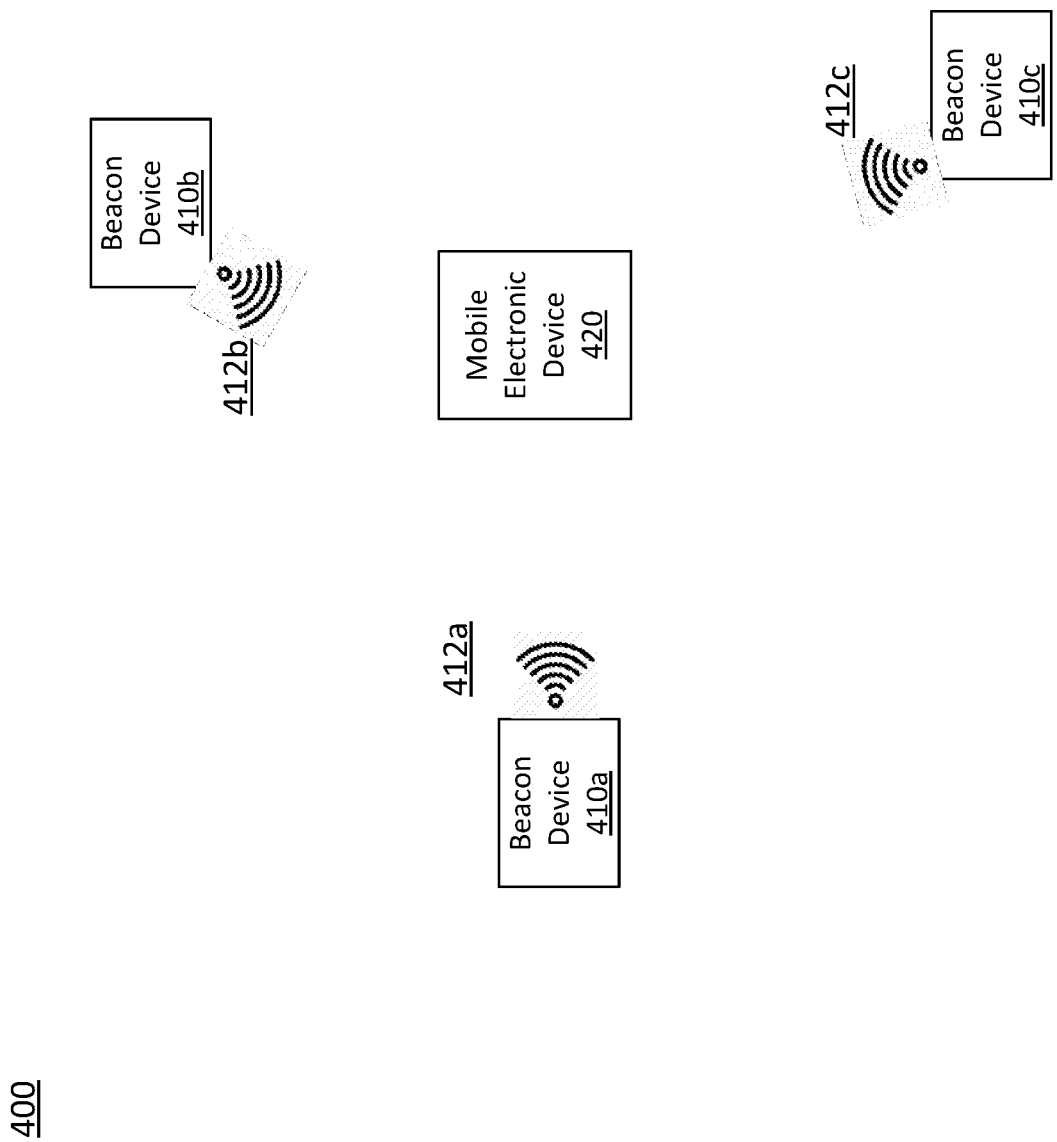

Example Environments in which a Location of a Mobile Electronic Device is Determined FIG. 4A illustrates an example environment 400 in which a location of a mobile electronic device is determined, according to some embodiments. Environment 400 includes a plurality of beacon devices 410a-c and a mobile electronic device 420. In accordance with some embodiments, beacon devices 410a-c are implemented as beacon device 100 of FIG. 1 and mobile electronic device 420 is implemented as electronic device 300 of FIG. 3.

As illustrated, three beacon devices 410a-c are placed within an environment at known locations. In one embodiment, the beacon devices 410a-c are stationary and do not move. In another embodiment, at least one of beacon devices 410a-c is mobile, but has a known location during transmission of their identifier. Mobile electronic device 420 receives beacon signals 412a-c from beacons 410a-c when mobile electronic device 420 moves into range for receiving the signals from a respective beacon device 410a-c. Beacon signal 412a-c includes an identifier of beacon device 410a-c that is transmitting a respective beacon signal 412a-c.

Mobile electronic device 420 determines a distance of each beacon device 410a-c from mobile electronic device 420. In one embodiment, the distance is determined based in part on the received signal strength of beacon signals 412a-c. In one embodiment, beacon devices 410a-c include associated calibration factors. The distance of mobile electronic device 420 to each beacon device 410a-c can be adjusted according to the calibration factor. Mobile electronic device 420 determines a location of the mobile electronic device 420 based at least on part on the distance of the mobile electronic device 420 from each beacon device 410a-c for which the plurality of beacon signals 412a-c is received.

FIG. 4B illustrates another example environment 450 in which a location of a mobile electronic device 470 is determined, according to some embodiments. Environment 450 includes a plurality of beacon devices 460a-c and a mobile electronic device 470. Mobile electronic device 470 is also able to communicate with remote computer system 480 over wireless network 494. In accordance with some embodiments, beacon devices 460a-c are implemented as beacon device 100 of FIG. 1 and remote computer system 480 is implemented as electronic device 300 of FIG. 3. It should be appreciated that mobile electronic device 470 can be implemented as electronic device 200 of FIG. 2 or electronic device 300 of FIG. 3.

As illustrated, three beacon devices 460a-c are placed within an environment at known locations. In one embodiment, the beacon devices 460a-c are stationary and do not move. In another embodiment, at least one of beacon devices 460a-c is mobile, but has a known location during transmission of their identifier. Mobile electronic device 470 receives beacon signals 462a-c from beacons 460a-c when mobile electronic device 470 moves into range for receiving the signals from a respective beacon device 460a-c. Beacon signal 462a-c includes an identifier of beacon device 460a-c that is transmitting a respective beacon signal 462a-c.

Mobile electronic device 470 measures a signal strength for each beacon signal 462a-c. In one embodiment, mobile electronic device 470 transmits the signal strength measurements and identifiers for each beacon device 460a-c to remote computer system 480. It should be appreciated that mobile electronic device 470 may perform all processing for location determination, provided the internal componentry allows for such processing. For purposes of the illustrated embodiment, all processing for location determination based on measured signal strength and identifiers for beacons 460a-c is performed at remote computer system 480.

Remote computer system 480 determines a distance of each beacon device 460a-c from mobile electronic device 470. In one embodiment, the distance is determined based in part on the received signal strength of beacon signals 462a-c. In one embodiment, beacon devices 460a-c include associated calibration factors. The distance of mobile electronic device 470 to each beacon device 460a-c can be adjusted according to the calibration factor. Remote computer system 480 determines a location of the mobile electronic device 470 based at least on part on the distance of the mobile electronic device 470 from each beacon device 460a-c for which the plurality of beacon signals 462a-c is received.

Figure 5:
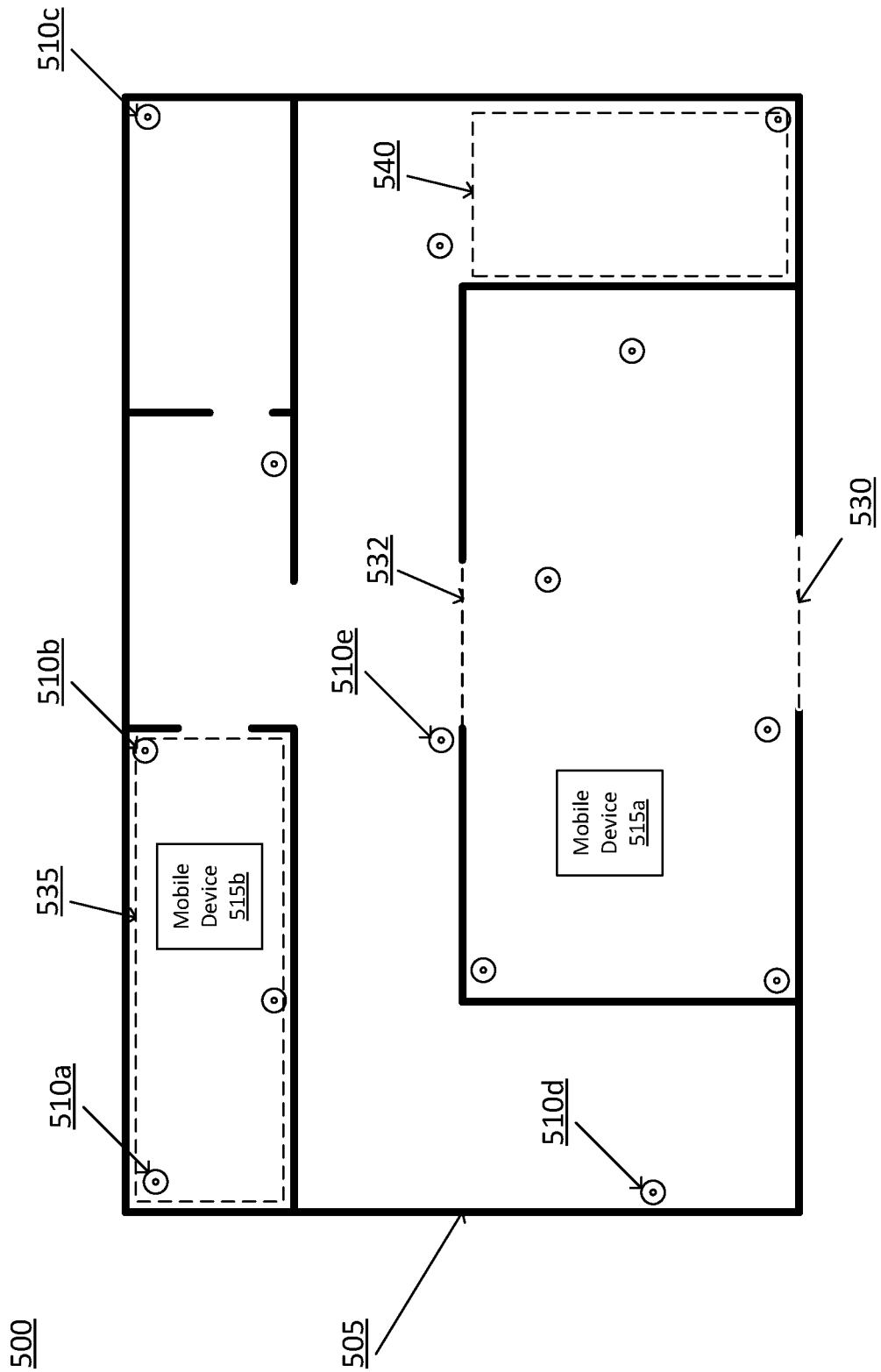
FIG. 5 illustrates an example map of an environment in which a location of a mobile electronic device is determined, according to some embodiments.

FIG. 5 illustrates an example map 505 of an environment 500 in which a location of a mobile electronic device is determined, according to some embodiments. In one embodiment, map 505 is displayed at a computer system (e.g., a remote management system).

In one embodiment, map 505 is an image file that is uploaded to the computer system (e.g., a bitmap file). The map is scaled such that the dimensions of the environment captured in the map are consistent with the actual dimensions. Beacon markings (e.g., beacon markings 510a-e) are indicated in map 505 and are representative of their known location. It should be appreciated that any number of beacon devices may be placed within an environment, and that the illustrated placement of beacon devices is an example.

In accordance with various embodiments, once the locations of beacons are known in an environment 500, virtual fences and/or virtual areas (collectively referred to as "virtual zones") may be detected, generated or manipulated. Virtual fences (e.g., virtual fence 530 and 532) refer to artificially created boundaries (e.g., a virtual wall) defined within the physical boundaries of the environment. Virtual zones (e.g., virtual areas 535 and 540) refer to artificially created zones defined within the physical boundaries of the environment. It should be appreciated that a virtual area can be conceived of comprising multiple virtual fences. For example, environment 500 is a building including a number of rooms and hallways. Virtual fence 530 is placed at an opening to the building and virtual fence 532 is placed at an opening between a room and a hallway. Moreover, virtual areas 535 and 540 are placed at rooms within the building. It should be appreciated that different configurations of virtual areas and virtual fences may be use. For example, the virtual fences may coincide with the walls separating the four rooms such that each room is defined to be a zone. Alternatively, the virtual fences may define zones that subdivide rooms into more than one zone or place a plurality of rooms in the same zone.

The described embodiments provide a solution that delivers precise "GPS-Free" indoor/outdoor user location tracking and events with radial and geometric zones for any physical location and layout. A user may interact with map 505 and visually draw the layout of the physical location and beacon placement to track location information down to inches. The user may create radial and rectangular zones and track intersections, enters, and exits with call-back events.

In some embodiments, a computer system (e.g., remote computer system 480) may be used to manipulate the virtual fences in environment 500 on the fly. For example, environment 500 may be an indoor structure with a plurality of rooms where access is limited due to security reasons during an event. During the event, the computer system may be employed to manipulate or move the virtual fences to encompass more or less of the limited access area. In one embodiment, access to the limited access areas may be controlled by networked door locks or smart door locks. For example, an individual authorized to enter the limited access area may carry a mobile electronic device such as a smart phone or an electronic wristband. When the system detects that the mobile electronic device is proximity to the smart lock, then the smart lock may be automatically opened. In this example, a person's or a group's access may be changed on the fly. The computer system may allow a lay person or a person who is not experienced in creating and manipulating virtual fences to perform such operations via a user friendly interface. The interface may display map 505 of environment 500 with an overlay of the virtual fences. A user may manipulate the virtual fences by clicking and dragging or using other commands in the interface. The interface comprises tools to outlay zones for events within the environment. The virtual fences or zones may be quickly generated by users without the user being required to program code.

The described embodiments may be used in many different types of environments 500. For example, environment 500 may be a retail environment and the virtual fences and virtual areas may track the movements of a shopper within the environment. A virtual fence may be encountered by a shopper in a specific location of the store and then trigger a coupon to be sent to the shopper (e.g., for display on the mobile device 515*a* associated with the shopper). In another example, the encounter with a virtual fence may result in directions being sent to a user (e.g., for display on the mobile device 515*a* associated with the user). Embodiments described herein may be employed in retail, healthcare, manufacturing, entertainment venues, amusement parks, museums, etc. For example, in a manufacturing environment, the described embodiments may be used to track workers, machines, may provide access to turn on machines, provide proximity based authentication, security clearance, define safety zones, etc. In one embodiment, the described embodiments are combined with biometrics on devices to further identify which individual is in which location associated with the mobile device for security purposes.

The mobile devices 515*a* and 515*b* are electronic devices that are mobile within environment 500 and may be more sophisticated than a stationary beacon. Mobile devices 515*a* and 515*b* serves a different purpose than the computer system as described herein that is employed to generate or manipulate the virtual fences and virtual areas where mobile devices 515*a* and 515*b* are tracked by the system within the environment 500. When a mobile electronic device encounters a virtual fence or virtual area, the system may cause an event to occur such as a unlocking a door or causing an alarm to sound. The mobile electronic device may be, but is not limited to, a smart phone executing an app specific to the present technology, a handheld device, a wearable device, a tablet, a smart watch, etc.

In one embodiment, a mobile electronic device or a remote computer system employs beacon devices and triangulation to determine a location of the mobile electronic device within environment 500. In other embodiments, a probabilistic model approach is used to determine a location of the mobile electronic device within environment 500. For instance, beacon signals may be noisy, precluding the use of a typical triangulation algorithm. In one embodiment, Monte Carlo Localization (MCL) is used to estimate with more accuracy a real position and an estimation of its trajectory in the environment. For example, MCL may be used to localize using a particle filter given a map of the environment.

For example, this may occur in an environment where GPS does not function. In one embodiment, a minimum of three beacons are used in environment 500. In a larger environment, more than three beacons may be required. For example, if a beacon device's transmission range is 100 feet and an environment has dimensions larger than 100 feet, more than three beacons will be needed. It should be appreciated that any number of beacons may be placed within an environment.

Prior attempts to use low power beacons to determine location in an environment encountered problems based on the variability of different beacons. For example, different beacon manufacturers use different batteries, are prone to different types of interference or noise, are affected by temperature differently, etc. The described embodiments have overcome these problems with the development of a software stack as will be explained below. The described embodiments are able to accurately determine the location of a beacon in an environment with an accuracy measured in inches rather than feet.

In one embodiment, the present technology is able to receive and/or measure all of the noise from a plurality of beacons and other devices in a given environment and average this noise to determine an accurate signal strength determination for each beacon. Such a technique employs signal to noise ratios (SNR).

Figure 6:
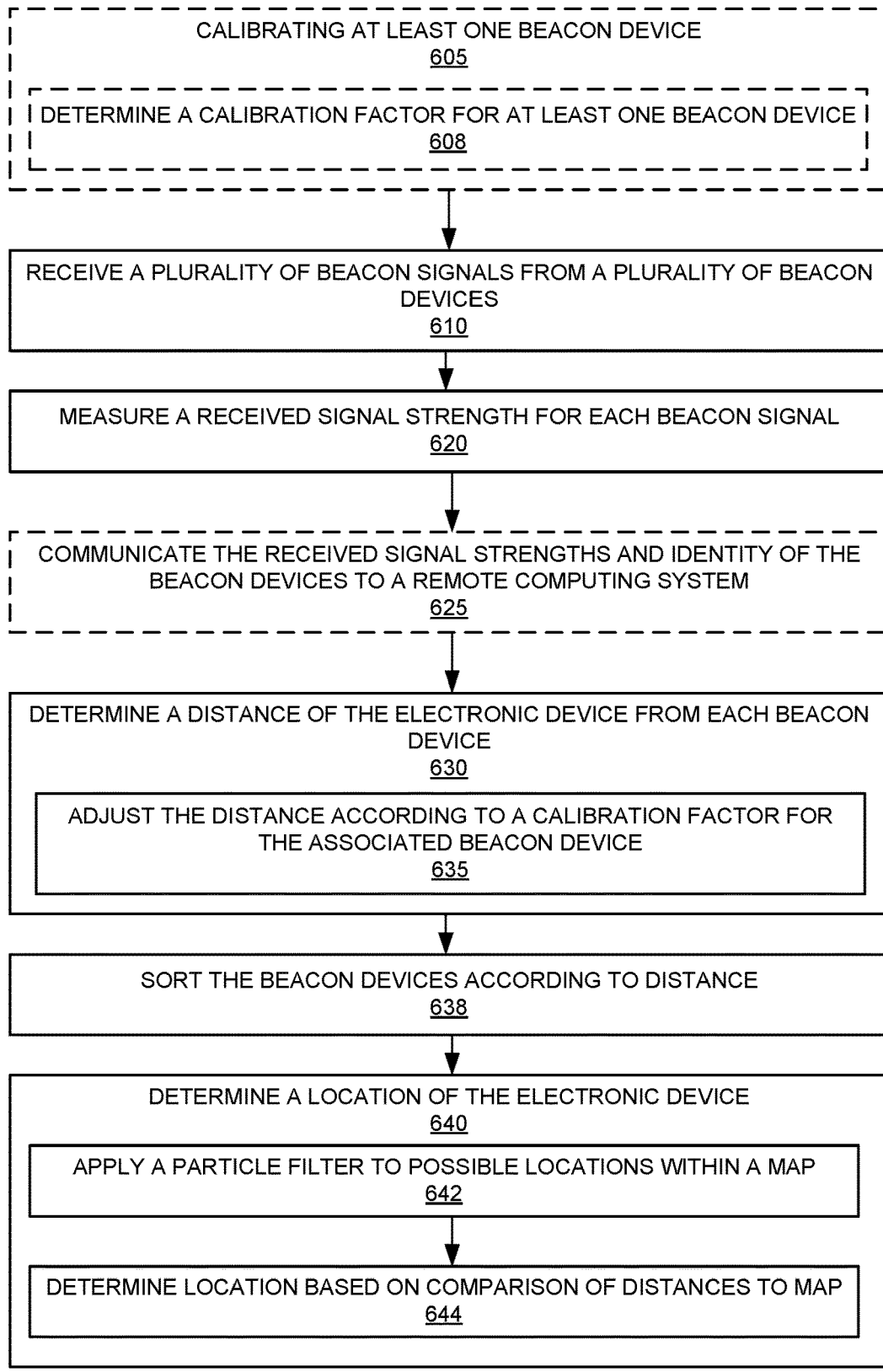
FIG. 6 illustrates a flow diagram of an example method for determining a location of an electronic device, according to various embodiments.

Example Location Determination of a Mobile Electronic Device Using Beacon Devices FIG. 6 illustrates a flow diagram 600 of an example method for determining a location of an electronic device, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

In one embodiment, at procedure 605 of flow diagram 600, at least one beacon device is calibrated such that the received signal strengths for the plurality of beacon devices are normalized. In one embodiment, as shown at procedure 608, a calibration factor for at least one beacon device of the plurality of beacon devices is determined. For example, the beacon devices are calibrated such that for a predetermined distance between the electronic device and each beacon device, the same received signal strength for a particular beacon multiplied by the calibration factor for that particular beacon will provide consistent results across all beacons.

In one embodiment, the calibration is performed automatically in response to a proximity event between the electronic device and a beacon device. In one embodiment, a proximity event is identified when the electronic device detects a signal from a beacon device and is located within a specific distance from the beacon device (e.g., the electronic device gets within a certain distance of a beacon device).

The calibration calculates a calibration factor based on the known distances between the beacon closest to the electronic device and to a plurality of other beacons. In one embodiment, the calibration factor is calculated according to the following equation 1:

$$\text{Calibration Factor} = n(-10 * \log*(d)) - (SS - A) \quad (1)$$

Where n is the signal propagation constant, d is the known real distance between the beacon and the electronic device, SS is the measured signal strength, and A is the theoretical transmit power of the beacon.

In one embodiment, during automatic calibration, beacon devices are calibrated in relation to the beacon device physically closest one to the electronic device at one specific moment. The proximity event moment arises when the electronic device detects that it is at a specific distance (e.g., 1.5 meters) to the closest beacon and is within that distance for a period of time (e.g., 2 seconds). The automatic calibration provides a calibration factor for each beacon device each time the electronic device passes by a beacon device within the specific distance. To calculate the calibration factor, equation 1 is used with a distance constant and using the actual distance between each beacon devices and the closest beacon device (e.g., real measures from known locations of beacon devices.

In another embodiment, manual calibration is performed. For example, manual calibration may be performed at system setup (e.g., one time), at regular time intervals (e.g., monthly), or during system maintenance (e.g., beacon device firmware is updated or beacon devices are moved/replaced). During manual calibration, one or more points in a map of the environment are selected, and the system is calibrated from those selected points, passing to the system the actual coordinates. This results in a calibration factor for each beacon device.

In one embodiment, at procedure 610 of flow diagram 600, a plurality of beacon signals are received from a plurality of beacon devices at the electronic device, wherein each beacon signal of the plurality of beacon signals includes an identity of a beacon device transmitting a respective beacon signal, and wherein each beacon device of the plurality of beacon devices has a known location. It should be appreciated that beacon signals may be received from any beacon device within range of the receiver of the electronic device (e.g., receiver 240 or I/O device 320)

At procedure 620, a received signal strength for each beacon signal of the plurality of beacon signals is measured. In one embodiment, the receiver (e.g., receiver 240 or I/O device 320) is configured to measure the received signal strength.

At procedure 625, in one embodiment, the received signal strength for each beacon signal of the plurality of beacon signals and the identity of the beacon device transmitting a respective beacon signal are communicated to a remote computing device. It should be appreciated that procedure 625 is optional, and may be dependent on the functionality of the electronic device. In one embodiment, where the received signal strength and identity information is communicated to a remote computer system, at least procedures 630 and 640 are performed at the remote computer system. In one embodiment, where procedure 625 is not performed, at least procedures 630 and 640 are performed at the electronic device.

At procedure 630, a distance of the electronic device from each beacon device for which the plurality of beacon signals is received is determined, wherein the distance of the electronic device from a beacon device is based at least in part on the received signal strength of the beacon signal transmitted by the beacon device. In one embodiment, the relationship between received signal strength and distance is calculated according to the following equation 2:

$$SS = (-10 * n * \log(d) + A) \quad (2)$$

Where SS is the measured signal strength, n is the signal propagation constant, d is the distance between the beacon and the electronic device, and A is the theoretical transmit power of the beacon. Solving equation 2 for d provides the distance determination.

In one embodiment, a beacon device of the plurality of beacon devices has an associated calibration factor. In one embodiment, as shown at procedure 635, the distance of the electronic device from each beacon device for which the plurality of beacon signals is received is adjusted according to the associated calibration factor for each beacon device. In one embodiment, the relationship between received signal strength and distance is calculated according to the following equation 3:

$$SS = (-10 * n * \log(d) + A - \text{Calibration Factor}) \quad (3)$$

Where n is the signal propagation constant, d is the distance between the beacon and the electronic device, SS is the measured signal strength, A is the theoretical transmit power of the beacon, and Calibration Factor is the calibration factor for the beacon. Solving equation 3 for d provides the distance determination.

At procedure 638, the beacon devices are sorted according to distance. A list of beacon devices sorted by distance is arranged such that the first element is the nearest beacon device to the electronic device, where the distance is taken from the distance determined at procedure 630. The following beacon devices in the list are the nearest beacon devices to the first beacon device one based on the actual distances between the beacon devices (e.g., according to the known placement or the map.) The list of beacons sorted according to distance allows for the use of the closest beacon devices to the electronic device for determining the location of the electronic device. For example, due to distance, walls, noise, etc., the position of a particular beacon device may be inaccurate. In such situations, the list of beacon devices sorted by distance allows for the use of the closest beacon devices regardless of the estimated or determined distance.

At procedure 640, a location of the electronic device is determined based at least on part on the distance of the electronic device from each beacon device for which the plurality of beacon signals is received. In one embodiment, the location is determined based on a triangulation of the distances between three beacons and the electronic device. It should be appreciated that any number of beacons can be used, where less than three beacons will provide a proximity determination and more than three beacons will provide a location determination with higher accuracy.

It should also be appreciated that embodiments described herein may be implemented in environments having more than one story (e.g., a two-story or taller building). As the known location of each beacon will also have a known three-dimensional position, the more beacon signals that are received at the electronic device, the greater the accuracy of the location determination.

In one embodiment, the location of the electronic device is determined within a map of an environment. As shown at procedure 642, a particle filter is applied to possible locations of the electronic device with the map of the environment. At procedure 644, the location is determined based on a comparison of the distance of the electronic device from each beacon device for which the plurality of beacon signals is received to the map of the environment.

Applying a particle filter provides for solving nonlinear filtering problems arising in signal processing and Bayesian statistical inference. The filtering problem occurs due to estimating the internal states in dynamical systems when partial observations are made, and random perturbations are present in the sensors as well as in the dynamical system. The objective is to compute the conditional probability of the states of some process, given some noisy and partial observations. Solving large scale systems, unstable processes or when the nonlinearities are not sufficiently smooth.

In one embodiment, Monte Carlo Localization (MCL) is used to localize using a particle filter given a map of the environment. MCL estimates the position and orientation of an electronic device as it moves and senses the environment. MCL uses a particle filter to represent the distribution of likely states, with each particle representing a possible state, e.g., a hypothesis of where the electronic device is. MCL typically starts with a uniform random distribution of particles over the configuration space, meaning there is no information about where the electronic device is and assumes it the electronic device is equally likely to be at any point in space. Whenever the electronic device moves, the particles are shifted to predict its new state after the movement. Whenever the electronic device senses something, the particles are resampled based on recursive Bayesian estimation, e.g., on how well the actual sensed data correlate with the predicted state. Ultimately, the particles should converge towards the actual location of the electronic device. Moreover, using the list of beacon devices sorted by distance data allows the MCL to converge towards the actual location more quickly than without the sorted list.

In accordance with various embodiments, smoothing of results and a path position may be performed. For instance, different filters (e.g., Kalman filters) to adapt the estimate raw position to the special characteristics of the current map may be utilized. This might improve performance where boundaries, added paths (e.g., given the position in the path), possible jumps of the position due to slight sudden movements, etc., impact the accuracy of the results.

Figure 7:
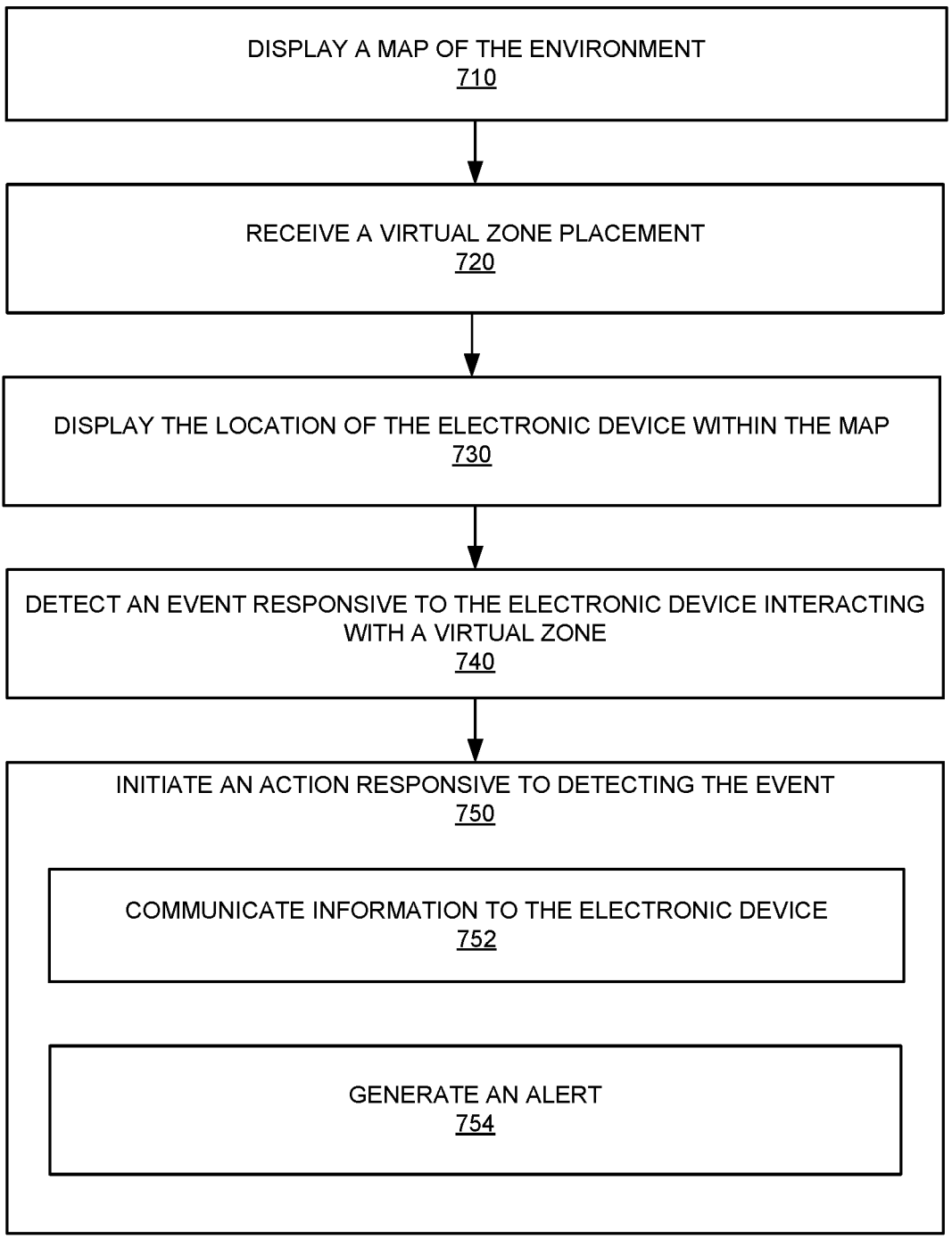
FIG. 7 illustrates a flow diagram of an example method for managing an environment, according to various embodiments.

FIG. 7 illustrates a flow diagram of an example flow diagram 700 for managing an environment, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

In one embodiment, at procedure 710 of flow diagram 700, the map (e.g., map 505) of the environment is displayed. In one embodiment, as shown at procedure 720, virtual zone placement (e.g., virtual areas or virtual fences) is received at the map.

At procedure 730, the location of the electronic device (e.g., mobile device 515*a* or 515*b*) within the map of the environment is displayed. For example, the location determined in flow diagram 600 is displayed as an icon representing the electronic device within the map.

In one embodiment, at procedure 740, where the map includes at least one virtual zone, an event is detected responsive to determining that the electronic device encounters the virtual zone. For example, with reference to FIG. 5, an event is detected when mobile device 515*a* or 515*b* encounters a virtual zone. For instance, an event is detected if a mobile device crosses a virtual fence 530 or an event is detected if a mobile device enters virtual area 540.

In one embodiment, at procedure 750, an action is initiated responsive to the detecting the event. In one embodiment, as shown at procedure 752, information is communicated to the electronic device. For example, where the environment is a museum, an action may cause information related to a particular exhibit to be displayed on the electronic device or an audible recording may be played to provide information about the exhibit. In one embodiment, as shown at procedure 754, an alert is generated. For example, if the environment includes rooms that are secure locations, an alert to security personnel may be generated in response to an electronic device entering a secure location. It should be appreciated that many different types of actions may be initiated, depending on the environment and the location of virtual zones.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for determining a location of an electronic device, the method comprising:
in response to identifying a proximity event between the electronic device and at least one beacon device of a plurality of beacon devices, calibrating the at least one beacon device by calculating an associated calibration factor for the at least one beacon device, the associated calibration factor based at least in part on a signal propagation constant, a measured signal strength, and a theoretical transmit power of the beacon device;
receiving a plurality of beacon signals from a plurality of beacon devices at the electronic device, wherein each beacon signal of the plurality of beacon signals comprises an identity of a beacon device transmitting a respective beacon signal, and wherein each beacon device of the plurality of beacon devices has a known location;
measuring a received signal strength for each beacon signal of the plurality of beacon signals;
determining a distance of the electronic device from each beacon device for which the plurality of beacon signals is received, wherein the distance of the electronic device from a beacon device is based on the received signal strength of the beacon signal transmitted by the beacon device, wherein the determining a distance of the electronic device from each beacon device for which the plurality of beacon signals is received comprises:
receiving the associated calibration factor for each beacon device for which the plurality of beacon signals is received; and
adjusting the distance of the electronic device from each beacon device for which the plurality of beacon signals is received according to the associated calibration factor for each beacon device;
determining a location of the electronic device based on the distance of the electronic device from each beacon device for which the plurality of beacon signals is received, wherein the location of the electronic device is determined within a map of an environment, wherein the determining a location of the electronic device based on the distance of the electronic device from each beacon device for which the plurality of beacon signals is received comprises:
determining an estimated location of the electronic device;
applying a particle filter to possible locations of the electronic device within the map of the environment, wherein the particle filter utilizes the estimated location of the electronic device, a prior estimated location of the electronic device, and a list of the plurality of beacon devices sorted according to the distance from the electronic device;
determining the location based on a comparison of the distance of the electronic device from each beacon device for which the plurality of beacon signals is received to the map of the environment; and
performing smoothing using a different filter to adapt the location to the map of the environment; and
displaying the map of the environment, wherein the map comprises at least one virtual fence, wherein a virtual fence is an artificially created boundary within the map;
displaying the location of the electronic device within the map of the environment; and
responsive to determining that the electronic device encounters the virtual fence, detecting an event.

2. The method of claim 1, further comprising:
sorting the plurality of beacon devices according to a distance from the electronic device.

3. The method of claim 1, wherein the map comprises at least one virtual zone, wherein a virtual zone comprises a plurality of virtual fences, the method further comprising:
responsive to determining that the electronic device encounters the virtual zone, detecting a second event.

4. The method of claim 1, further comprising:
responsive to the detecting the event, initiating an action.

5. The method of claim 1, further comprising:
communicating the received signal strength for each beacon signal of the plurality of beacon signals and the identity of the beacon device transmitting a respective beacon signal to a remote computing device, wherein the determining a distance of the electronic device from each beacon device for which the plurality of beacon signals is received and the determining a location of the electronic device based on the distance of the electronic device from each beacon device for which the plurality of beacon signals is received are performed at the remote computing device.

6. The method of claim 1, wherein the determining a distance of the electronic device from each beacon device for which the plurality of beacon signals is received and the determining a location of the electronic device based on the distance of the electronic device from each beacon device for which the plurality of beacon signals is received are performed at the electronic device.

7. The method of claim 1, further comprising:
calibrating the plurality of beacon devices such that the received signal strength for the plurality of beacon devices are normalized.

8. The method of claim 7, wherein the calibrating the plurality of beacon devices comprises:
determining a calibration factor for at least one beacon device of the plurality of beacon devices.

9. The method of claim 1, wherein the proximity event arises in response to the electronic device is within a specific distance to the at least one beacon device for at least a period of time.

10. A mobile electronic device comprising:
a receiver configured to receive a plurality of beacon signals from a plurality of beacon devices and to measure a received signal strength for each beacon signal of the plurality of beacon signals, wherein each beacon signal of the plurality of beacon signals comprises an identity of a beacon device transmitting a respective beacon signal, wherein a beacon device of the plurality of beacon devices has an associated calibration factor based at least in part on a signal propagation constant, a measured signal strength, and a theoretical transmit power of the beacon device, and wherein each beacon device of the plurality of beacon devices has a known location;
a processor capable of determining a location of the mobile electronic device, wherein the processor is operable to:
determine a distance of the mobile electronic device from each beacon device for which the plurality of beacon signals is received, wherein the distance of the mobile electronic device from a beacon device is based on the received signal strength of the beacon signal transmitted by the beacon device;
receive the associated calibration factor for each beacon device for which the plurality of beacon signals is received;
adjust the distance of the mobile electronic device from each beacon device for which the plurality of beacon signals is received according to the associated calibration factor for each beacon device, wherein the associated calibration factor for each beacon device is calculated in response to identifying a proximity event between the mobile electronic device and at least one beacon device of a plurality of beacon devices;
determine a location of the mobile electronic device based on the distance of the mobile electronic device from each beacon device for which the plurality of beacon signals is received, wherein the location of the mobile electronic device is determined within a map of an environment, wherein the location of the electronic device is determined by determining an estimated location of the electronic device, applying a particle filter to possible locations of the electronic device within the map of the environment, wherein the particle filter utilizes the estimated location of the electronic device, a prior estimated location of the electronic device, and a list of the plurality of beacon devices sorted according to the distance from the electronic device, determining the location based on a comparison of the distance of the electronic device from each beacon device for which the plurality of beacon signals is received to the map of the environment, and performing smoothing using a different filter to adapt the location to the map of the environment;
display the map of the environment, wherein the map comprises at least one virtual fence, wherein a virtual fence is an artificially created boundary within the map;
display the location of the mobile electronic device within the map of the environment; and
detect an event responsive to determining that the mobile electronic device encounters the virtual fence.

11. The mobile electronic device of claim 10, wherein the map comprises at least one virtual zone, wherein a virtual zone comprises a plurality of virtual fences, wherein the processor is further operable to:
responsive to determining that the mobile electronic device encounters the virtual zone, detect a second event; and
responsive to detecting the second event, initiate an action.

12. A non-transitory computer readable storage medium having computer readable program code stored thereon for causing a computer system to perform a method for determining a location of an electronic device, the method comprising:
in response to identifying a proximity event between the electronic device and at least one beacon device of a plurality of beacon devices, calibrating the at least one beacon device by calculating an associated calibration factor for the at least one beacon device, the associated calibration factor based at least in part on a signal propagation constant, a measured signal strength, and a theoretical transmit power of the beacon device;
receiving a plurality of beacon signals from a plurality of beacon devices at the electronic device, wherein each beacon signal of the plurality of beacon signals comprises an identity of a beacon device transmitting a respective beacon signal, wherein each beacon device of the plurality of beacon devices has a known location;
measuring a received signal strength for each beacon signal of the plurality of beacon signals;
determining a distance of the electronic device from each beacon device for which the plurality of beacon signals is received, wherein the distance of the electronic device from a beacon device is based on the received signal strength of the beacon signal transmitted by the beacon device;
receiving the associated calibration factor for each beacon device for which the plurality of beacon signals is received;
adjusting the distance of the electronic device from each beacon device for which the plurality of beacon signals is received according to the associated calibration factor for the at least one beacon device;
determining a location of the electronic device based on the distance of the electronic device from each beacon device for which the plurality of beacon signals is received, wherein the location of the electronic device is determined within a map of an environment, wherein the determining a location of the electronic device based on the distance of the electronic device from each beacon device for which the plurality of beacon signals is received comprises:
determining an estimated location of the electronic device;
applying a particle filter to possible locations of the electronic device within the map of the environment;
determining the location based on a comparison of the distance of the electronic device from each beacon device for which the plurality of beacon signals is received to the map of the environment, wherein the particle filter utilizes the estimated location of the electronic device, a prior estimated location of the electronic device, and a list of the plurality of beacon devices sorted according to the distance from the electronic device; and
performing smoothing using a different filter to adapt the location to the map of the environment;
displaying the map of the environment, wherein the map comprises at least one virtual fence, wherein a virtual fence is an artificially created boundary within the map;
displaying the location of the electronic device within the map of the environment; and
responsive to determining that the electronic device encounters the virtual fence, detecting an event.

13. The non-transitory computer readable storage medium of claim 12, wherein the map comprises at least one virtual zone, wherein a virtual zone comprises a plurality of virtual fences, the method further comprising:

responsive to determining that the electronic device encounters the virtual zone, detecting a second event; and responsive to the detecting the second event, initiating an action.

14. The non-transitory computer readable storage medium of claim 13, wherein the initiating an action comprises: communicating information to the electronic device.

15. The non-transitory computer readable storage medium of claim 13, wherein the initiating an action comprises: generating an alert.

\* \* \* \* \*